(12) United States Patent
Jeong

(10) Patent No.: US 9,749,081 B2
(45) Date of Patent: Aug. 29, 2017

(54) WAVELENGTH/BANDWIDTH TUNABLE OPTICAL FILTER AND DRIVING METHOD THEREOF

(71) Applicant: ELECTRONICS AND TELECOMMUNICATIONS RESEARCH INSTITUTE, Daejeon (KR)

(72) Inventor: Jong Sool Jeong, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/012,335

(22) Filed: Feb. 1, 2016

(65) Prior Publication Data

US 2016/0226616 A1    Aug. 4, 2016

(30) Foreign Application Priority Data

Feb. 3, 2015  (KR) ........................ 10-2015-0016729

(51) Int. Cl.
*H04J 14/02*  (2006.01)
(52) U.S. Cl.
CPC ................. *H04J 14/0261* (2013.01)
(58) Field of Classification Search
CPC .................................................. H04J 14/0261
USPC ......................................................... 398/48
See application file for complete search history.

(56) References Cited

U.S. PATENT DOCUMENTS

| 5,712,932 | A | * | 1/1998 | Alexander | .......... | H04J 14/0212 |
| | | | | | | 385/17 |
| 7,777,957 | B2 | | 8/2010 | Sakurai et al. | | |
| 7,965,950 | B2 | * | 6/2011 | Childers | ................ | H04J 14/02 |
| | | | | | | 398/209 |
| 2001/0051019 | A1 | * | 12/2001 | Bailey | ................... | G02B 6/022 |
| | | | | | | 385/37 |
| 2002/0176134 | A1 | * | 11/2002 | Vohra | ................... | G02B 6/2932 |
| | | | | | | 398/82 |
| 2003/0223687 | A1 | * | 12/2003 | Blomquist | ........ | G02B 6/02204 |
| | | | | | | 385/37 |

(Continued)

FOREIGN PATENT DOCUMENTS

| KR | 10-2012-0053582 A | 5/2012 |
| WO | WO 2014-137183 A1 | 9/2014 |

OTHER PUBLICATIONS

Yasuki Sakurai et al., "LCOS-based Gridless Wavelength Blocker Array for Broadband Signals at 100Gbps and Beyond", Optical Fiber Communication Conference, Mar. 2012.

(Continued)

*Primary Examiner* — Dalzid Singh
(74) *Attorney, Agent, or Firm* — Rabin & Berdo, P.C.

(57) ABSTRACT

Provided herein is a wavelength/bandwidth tunable optical filter capable of flexibly tuning a wavelength and bandwidth, the wavelength/bandwidth tunable optical filter including an optical circulator configured to receive a WDM (Wavelength-Division-Multiplexing) optical signal from an optical cable; and a plurality of wavelength-tunable optical filters configured to receive the WDM optical signal via the optical circulator, wherein the plurality of wavelength-tunable optical filters reflect wavelengths of different bandwidths from one another.

10 Claims, 6 Drawing Sheets

(56) References Cited

U.S. PATENT DOCUMENTS

| 2004/0197097 | A1* | 10/2004 | Downie | H04B 10/07953 |
| | | | | 398/27 |
| 2013/0230327 | A1 | 9/2013 | Shin | |
| 2014/0147118 | A1 | 5/2014 | Lee et al. | |
| 2014/0233945 | A1 | 8/2014 | Jeong et al. | |
| 2016/0006536 | A1 | 1/2016 | Rhy et al. | |

OTHER PUBLICATIONS

Yuhua Huang et al., "Widely tunable optical filter with variable bandwidth based on the thermal effect on cholesteric liquid crystals", Applied Optics, vol. 51, No. 24, pp. 5780-5784, Aug. 20, 2012.

"Santec Optical Instruments—Wavelength & Bandwidth Tunable Filter. OTF-350", Santec Corporation; http://www.santec.com/ip/wp-content/uploads/OTF-350-C-E-v1.51406.pdf; copyright 2014.

* cited by examiner

WAVELENGTH/BANDWIDTH TUNABLE OPTICAL FILTER AND DRIVING METHOD THEREOF

CROSS-REFERENCE TO RELATED APPLICATION

The present application claims priority to Korean patent application number 10-2015-0016729, filed on Feb. 3, 2015, the entire disclosure of which is incorporated herein in its entirety by reference.

BACKGROUND

Field of Invention

Various embodiments of the present disclosure relate to a wavelength/bandwidth tunable optical filter and a driving method thereof, and more particularly, to a wavelength/bandwidth tunable optical filter capable of flexibly tuning a wavelength and bandwidth, and a driving method thereof.

Description of Related Art

With the increase of data processing capacity, much research is being conducted on technologies for realizing large-scale networks and flexible networks. In order to realize a network flexibilization technology, there is an increasing need for a wavelength/bandwidth tunable optical filter technology capable of detecting a WDM (Wavelength-Division-Multiplexing, hereinafter referred to as "WDM") optical signal having a wavelength and bandwidth in an optical communication network that has its basis on the WDM method.

WDM (Wavelength-Division Multiplexing) is a communication method of combining multiple optical signals having different wavelengths for transmission along one optical cable. In the WDM method, a subscriber is provided with a point-to-point exclusive channel through allocation of a unique and independent wavelength. Since each subscriber performs communication using optical signals of different wavelengths, the communication speed increases.

Meanwhile, in a metro or long distance optical communication system that has its basis on a software defined network (SDN), since wavelengths and data speed of optical signal can be changed, a wavelength/bandwidth tunable optical filter capable of suitably detecting characteristics of an optical signal is used as an essential optical component. However, currently well known wavelength/bandwidth tunable optical filters have limitations to be applied in metro or long distance optical communication systems due to their size, cost, and complexity in realizing the technology.

SUMMARY

Therefore, various embodiments of the present disclosure are directed to provide a wavelength/bandwidth tunable optical filter capable of flexibly tuning a wavelength and bandwidth, and a driving method thereof.

One embodiment of the present disclosure provides a wavelength/bandwidth tunable optical filter including an optical circulator configured to receive a WDM (Wavelength-Division-Multiplexing) optical signal from an optical cable; and a plurality of wavelength-tunable optical filters configured to receive the WDM optical signal via the optical circulator, wherein the plurality of wavelength-tunable optical filters reflect wavelengths of different bandwidths from one another.

In the embodiment, the optical circulator may provide the WDM optical signal to a first wavelength-tunable optical filter, and provide wavelengths of a certain bandwidth reflected by the first wavelength-tunable optical filter to a second wavelength-tunable optical filter.

In the embodiment, the optical circulator may provide at least one wavelength reflected by a last wavelength-tunable optical filter to an output port.

In the embodiment, the wavelength/bandwidth tunable optical filter may further include an optical switch for connecting the optical circulator to any one of the plurality of wavelength-tunable optical filters.

In the embodiment, the optical circulator may provide at least one wavelength reflected by the wavelength-tunable optical filter connected to the optical switch to an output port.

In the embodiment, a bandwidth of a wavelength reflected by each of the plurality of wavelength-tunable optical filters may be tunable.

Another embodiment of the present disclosure provides a wavelength/bandwidth tunable optical filter including a plurality of wavelength-tunable optical filters connected in series between an optical cable configured to receive a WDM optical signal and an output port, wherein the plurality of wavelength-tunable optical filters transmit wavelengths of different bandwidths from one another.

In the embodiment, a bandwidth of a wavelength transmitted by the plurality of wavelength-tunable optical filters may be tunable.

Another embodiment of the present disclosure provides a driving method of a wavelength/bandwidth tunable optical filter, the method including inputting a WDM optical signal into an optical circulator; providing the WDM optical signal from the optical circulator to at least one of a plurality of wavelength-tunable optical filters; and providing a wavelength of a certain bandwidth reflected by the at least one wavelength-tunable optical filter to an output port, wherein the plurality of wavelength-tunable optical filters reflect wavelengths of different bandwidths from one another.

According to a wavelength/bandwidth tunable optical filter and a driving method thereof according to various embodiments of the present disclosure, it is possible to provide optical signals of desired wavelengths to an output port while transmitting or reflecting a WDM optical signal using a plurality of wavelength-tunable optical filters. Such a wavelength/bandwidth tunable optical filter of the present disclosure may be realized with rather simple components such as a plurality of wavelength-tunable optical filters and optical circulator and the like, thereby reducing both the manufacturing cost and size.

BRIEF DESCRIPTION OF THE DRAWINGS

Embodiments will now be described more fully hereinafter with reference to the accompanying drawings; however, they may be embodied in different forms and should not be construed as limited to the embodiments set forth herein. Rather, these embodiments are provided so that the present disclosure will be thorough and complete, and will fully convey the scope of the embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
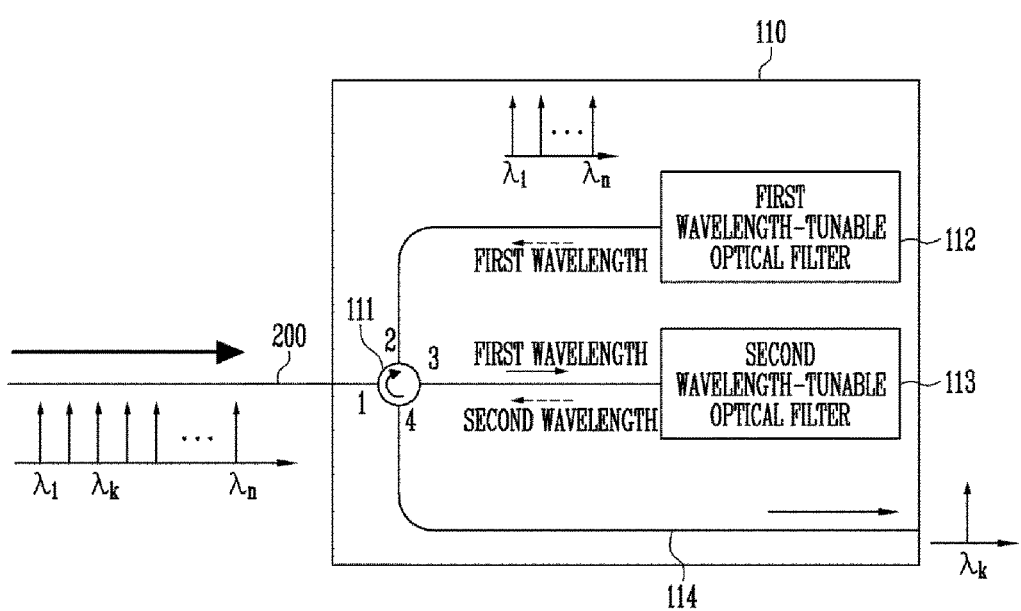
FIG. 1 is a view illustrating a wavelength/bandwidth tunable optical filter according to an embodiment of the present disclosure.

Objects, features and advantages of the present disclosure will become readily apparent by reference to the following detailed description when considered in conjunction with the accompanying drawings. The drawings are not necessarily to scale and in some instances, proportions may have been exaggerated in order to clearly illustrate features of the embodiments. Moreover, detailed descriptions related to well-known functions or configurations will be ruled out omitted in order not to unnecessarily obscure clearly describe the subject matters of the present disclosure. Like reference numerals in the drawings denote like elements.

Furthermore, 'connected/coupled' represents that one component is directly coupled to another component or indirectly coupled through another component. In this specification, a singular form may include a plural form as long as it is not specifically mentioned in a sentence. Furthermore, 'include/comprise' or 'including/comprising' used in the specification represents that one or more components, steps, operations, and elements exist or are added.

Terms such as 'first' and 'second' may be used to describe various components, but they should not limit the various components. Those terms are only used for the purpose of differentiating a component from other components. For example, a first component may be referred to as a second component, and a second component may be referred to as a first component and so forth without departing from the spirit and scope of the present disclosure. Furthermore, 'and/or' may include any one of or a combination of the components mentioned.

Furthermore, unless defined otherwise, all the terms used in this specification including technical and scientific terms have the same meanings as would be generally understood by those skilled in the related art. The terms defined in generally used dictionaries should be construed as having the same meanings as would be construed in the context of the related art, and unless clearly defined otherwise in this specification, should not be construed as having idealistic or overly formal meanings.

FIG. 1 is a view illustrating a wavelength/bandwidth tunable optical filter according to a first embodiment of the present disclosure.

Referring to FIG. 1, a wavelength/bandwidth tunable optical filter according to the first embodiment of the present disclosure 110 receives a WDM optical signal from an optical cable 200, and extracts an optical signal of one or more desired wavelengths (one or more from $\lambda 1$ to $\lambda n$) from the received WDM optical signal. For this purpose, the wavelength/bandwidth tunable optical filter 110 has an optical circulator 111, and a first wavelength-tunable optical filter 112 and second wavelength-tunable optical filter 113 configured to reflect wavelengths of different bandwidths.

The optical circulator 111 receives a WDM optical signal from the optical cable 200. The optical circulator 111 that received the WDM optical signal provides the WDM optical signal to the first wavelength-tunable optical filter 112, then to the second wavelength-tunable optical filter 113, and then to an output port 114. For example, the optical circulator 111 provides the WDM optical signal input from the optical cable 200 to the first wavelength-tunable optical filter 112, and then provides an optical signal reflected by the first wavelength-tunable optical filter 112 to the second wavelength-tunable optical filter 113. Furthermore, the optical circulator 111 provides an optical signal reflected by the second wavelength-tunable optical filter 113 to the output port 114. For this purpose, the optical circulator 111 may consist of a four-port optical circulator.

Figure 2A:
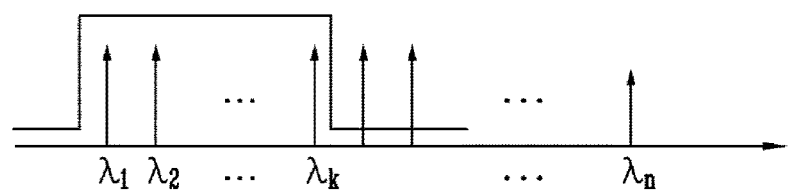
FIGS. 2A to 2C are views illustrating output wavelengths according to a first embodiment of a wavelength/bandwidth tunable optical filter.

Of n wavelengths ($\lambda 1$ to $\lambda n$), the first wavelength-tunable optical filter 112 reflects first wavelengths positioned in a first bandwidth, while transmitting the rest of the wavelengths. For example, as illustrated in FIG. 2A, the first wavelength-tunable optical filter 112 reflects a first wavelength ($\lambda 1$) to $k^{th}$ wavelength ($\lambda k$) (k being a natural number that is smaller than n), and transmits the rest of the wavelengths ($\lambda k+1$ to $\lambda n$). Herein, the first bandwidth of the first wavelength-tunable optical filter 112 is set to be tunable. For example, the first wavelength-tunable optical filter 112 may consist of optical components and optical modules such that a bandwidth is tunable.

Figure 2B:
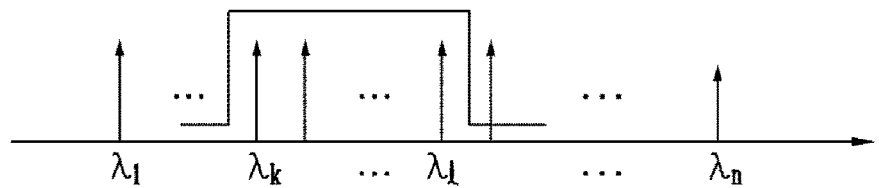

Of the n wavelengths ($\lambda 1$ to $\lambda n$), the second wavelength-tunable optical filter 113 reflects second wavelengths positioned in a second bandwidth that is different from the first bandwidth, while transmitting the rest of the wavelengths. For example, as illustrated in FIG. 2B, the second wavelength-tunable optical filter 113 reflects a kth wavelength ($\lambda k$) to 1th wavelength ($\lambda 1$) (1 being a natural number greater than k and smaller than n), and transmits the rest of the wavelengths ($\lambda 1$ to $\lambda k-1$, $\lambda 1+1$ to $\lambda n$). Herein, the second bandwidth of the second wavelength-tunable optical filter 113 is set to be tunable. For example, the second wavelength-tunable optical filter 113 may consist of optical components and optical modules such that a bandwidth is tunable.

To explain the operational process, first of all, the optical circulator 111 provides the WDM optical signal received from the optical cable 200 to the first wavelength-tunable optical filter 112. The first wavelength-tunable optical filter 112 that received the WDM optical signal reflects the first wavelengths ($\lambda 1$ to $\lambda k$), and transmits the rest of the wavelengths ($\lambda k+1$ to $\lambda n$).

Figure 2C:
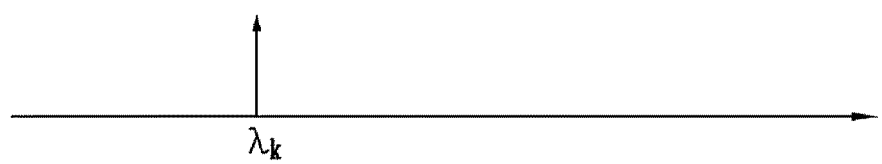

Then, the optical circulator 111 provides the first wavelengths ($\lambda 1$ to $\lambda k$) received from the first wavelength-tunable optical filter 112 to the second wavelength-tunable optical filter 113. Herein, since the second wavelength-tunable optical filter 113 reflects the second wavelengths ($\lambda k$ to $\lambda 1$), it reflects the $k^{th}$ wavelength ($\lambda k$) that is included in both the first wavelengths ($\lambda 1$ to $\lambda k$) and second wavelengths ($\lambda k$ to $\lambda 1$). The optical circulator 111 provides the $k^{th}$ wavelength ($\lambda k$) received from the second wavelength-tunable optical filter 113 to the output port 114. Accordingly, the $k^{th}$ wavelength ($\lambda k$) is output to the output port 114 as illustrated in FIG. 2C.

That is, the aforementioned wavelength/bandwidth tunable optical filter of the present disclosure 110 may provide optical signals of desired wavelengths to the output port 114 using the first wavelength-tunable optical filter 112 that reflects the first wavelengths ($\lambda 1$ to $\lambda k$) positioned in the first bandwidth and the second wavelength-tunable optical filter 113 that reflects the second wavelengths ($\lambda k$ to $\lambda 1$) positioned in the second bandwidth.

Meanwhile, the wavelength/bandwidth tunable optical filter of the present disclosure 110 may control the wavelength being output to the output port 114 by tuning the first bandwidth and second bandwidth.

Figure 3A:
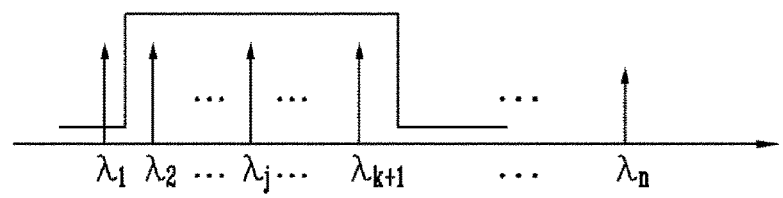
FIGS. 3A to 3C are views illustrating output wavelengths according to a second embodiment of a wavelength/bandwidth tunable optical filter.
Figure 3B:
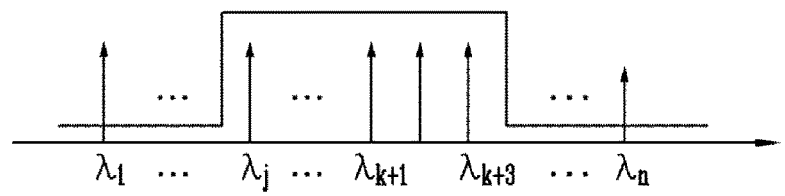
Figure 3C:
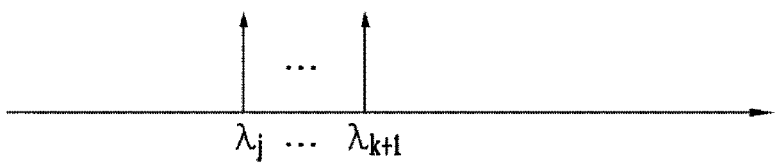

FIGS. 3A to 3C are views illustrating output wavelengths according to a second embodiment of a wavelength/bandwidth tunable optical filter.

One can see from FIGS. 3A to 3C that wavelengths being output may be changed by tuning the bandwidths of the first wavelength-tunable optical filter 112 and second wavelength-tunable optical filter 113.

More specifically, the first bandwidth of the first wavelength-tunable optical filter 112 is set to reflect a second wavelength ($\lambda 2$) to $k+1^{th}$ wavelength ($\lambda k+1$) as illustrated in FIG. 3A (that is, the bandwidth moves to long wavelength region). Furthermore, the second bandwidth of the second wavelength-tunable optical filter 113 is set to reflect a $j^{th}$ wavelength ($\lambda j$) (j being a natural number that is smaller than k) to $k+3^{th}$ wavelength ($\lambda k+3$) (that is, the bandwidth moves to short wavelength region).

In this case, the first wavelengths ($\lambda 2$ to $\lambda k+1$) reflected by the first wavelength-tunable optical filter 112 and the second wavelengths ($\lambda j$ to $\lambda k+3$) reflected by the second wavelength-tunable optical filter 113 have in common the $j^{th}$ wavelength ($\lambda j$) to $k+1^{th}$ wavelength ($\lambda k+1$). Therefore, to the output port 114 of the wavelength/bandwidth tunable optical filter 110, the $j^{th}$ wavelength ($\lambda j$) to $k+1^{th}$ wavelength ($\lambda k+1$) are output, as illustrated in FIG. 3C.

That is, the wavelength/bandwidth tunable optical filter of the present disclosure 110 may control the wavelengths being output by tuning the bandwidths of the first wavelength-tunable optical filter 112 and second wavelength-tunable optical filter 113.

Figure 4A:
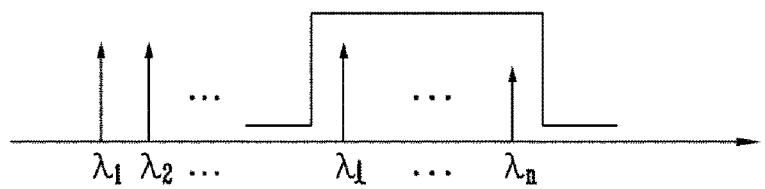
FIGS. 4A to 4C are views illustrating output wavelengths according to a third embodiment of a wavelength/bandwidth tunable optical filter.
Figure 4B:
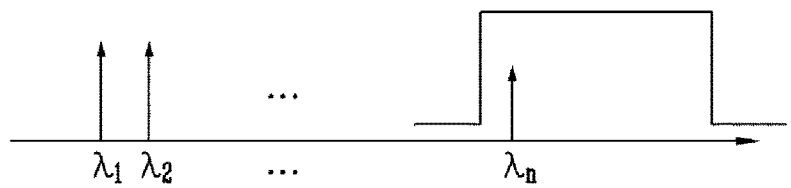
Figure 4C:
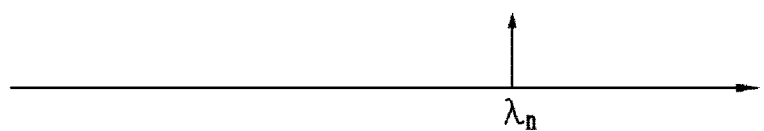

FIGS. 4A to 4C are views illustrating output wavelengths according to a third embodiment of a wavelength/bandwidth tunable optical filter.

Referring to FIGS. 4A to 4C, first of all, the first bandwidth of the first wavelength-tunable optical filter 112 is set to reflect the first wavelength ($\lambda 1$) to $n^{th}$ wavelength ($\lambda n$), as illustrated in FIG. 4A. Furthermore, the second bandwidth of the second wavelength-tunable optical filter 113 is set to reflect a plurality of waveforms from $n^{th}$ wavelength ($\lambda n$) and beyond, as illustrated in FIG. 4B.

In this case, the first wavelengths ($\lambda 1$ to $\lambda n$) reflected by the first wavelength-tunable optical filter 112 and the second wavelengths (a plurality of waveforms from $\lambda n$ and beyond) reflected by the second wavelength-tunable optical filter 113 have in common the $n^{th}$ wavelength ($\lambda n$). Therefore, to the output port 114 of the wavelength/bandwidth tunable optical filter 110, the $n^{th}$ wavelength ($\lambda n$) is output, as illustrated in FIG. 4C.

That is, the wavelength/bandwidth tunable optical filter of the present disclosure 110 may control the wavelengths being output by tuning the bandwidths of the first wavelength-tunable optical filter 112 and second wavelength-tunable optical filter 113.

Figure 5:
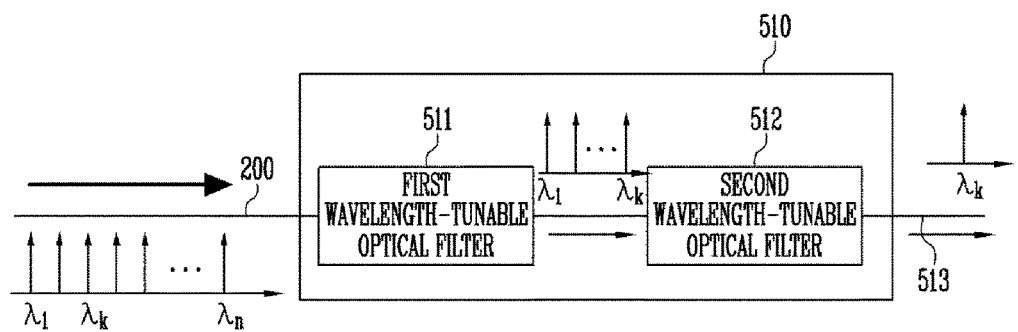
FIG. 5 is a view illustrating a wavelength/bandwidth tunable optical filter according to a second embodiment of the present disclosure.

FIG. 5 is a view illustrating a wavelength/bandwidth tunable optical filter according to a second embodiment of the present disclosure.

Referring to FIG. 5, a wavelength/bandwidth tunable optical filter according to the second embodiment of the present disclosure 510 receives a WDM optical signal from the optical cable 200, and provides one or more wavelengths (one or more from $\lambda 1$ to $\lambda n$) included in the received WDM optical signal to the output port 513. For this purpose, the wavelength/bandwidth tunable optical filter 510 has a first wavelength-tunable optical filter 511 and second wavelength-tunable optical filter 512. Herein, the first wavelength-tunable optical filter 511 and second wavelength-tunable optical filter 512 are connected in series between the optical cable 200 and output port 513, and transmits wavelengths of different bandwidths from each other.

Of the n wavelengths ($\lambda 1$ to $\lambda n$), the first wavelength-tunable optical filter 511 transmits first wavelengths positioned in the first bandwidth. For example, as illustrated in FIG. 2A, the first wavelength-tunable optical filter 511 may transmit the first wavelength ($\lambda 1$) to $k^{th}$ wavelength ($\lambda k$). Herein, the first bandwidth of the first wavelength-tunable optical filter 511 is set to be tunable. For example, the first wavelength-tunable optical filter 511 may consist of optical components and optical modules such that a bandwidth is tunable.

Of the n wavelengths ($\lambda 1$ to $\lambda n$), the second wavelength-tunable optical filter 512 transmits the second wavelengths positioned in the second bandwidth. For example, as illustrated in FIG. 2B, the second wavelength-tunable optical filter 512 may transmit the $k^{th}$ wavelength ($\lambda k$) to $1^{th}$ wavelength ($\lambda 1$). Herein, the second bandwidth of the second wavelength-tunable optical filter 512 is set to be tunable. For example, the second wavelength-tunable optical filter 512 may consist of optical components and optical modules such that a bandwidth is tunable.

To explain the operational process, first of all, a WDM optical signal from the optical cable 200 is input into the first wavelength-tunable optical filter 511. Of the n wavelengths ($\lambda 1$ to $\lambda n$), the first wavelength-tunable optical filter 511 that received the WDM optical signal transmits only the first wavelengths ($\lambda 1$ to $\lambda k$).

The first wavelengths ($\lambda 1$ to $\lambda k$) transmitted from the first wavelength-tunable optical filter 511 are input into the second wavelength-tunable optical filter 512. Of the first wavelengths ($\lambda 1$ to $\lambda k$), the second wavelength-tunable optical filter 512 that received the first wavelengths ($\lambda 1$ to $\lambda k$) transmits the wavelength positioned in the second wavelength ($\lambda k$ to $\lambda 1$) region, that is, the $k^{th}$ wavelength ($\lambda k$). Accordingly, the output port 513 is provided with the $k^{th}$ wavelength ($\lambda k$), as illustrated in FIG. 2C.

In the aforementioned second embodiment of the present disclosure, the first wavelength-tunable optical filter 511 and second wavelength-tunable optical filter 512 are connected in series between the optical cable 200 and output port 513, and it may be controlled such that at least one desired wavelength is output to the output port 513 using the first wavelengths ($\lambda 1$ to $\lambda k$) transmitted from the first wavelength-tunable optical filter 511 and the second wavelengths ($\lambda k$ to $\lambda 1$) transmitted from the second wavelength-tunable optical filter 512.

Meanwhile, the first bandwidth of the first wavelength-tunable optical filter 511 and the second bandwidth of the second wavelength-tunable optical filter 512 are tunable, and accordingly, it is possible to control the wavelengths being output to the output port 513 in various ways.

Figure 6:
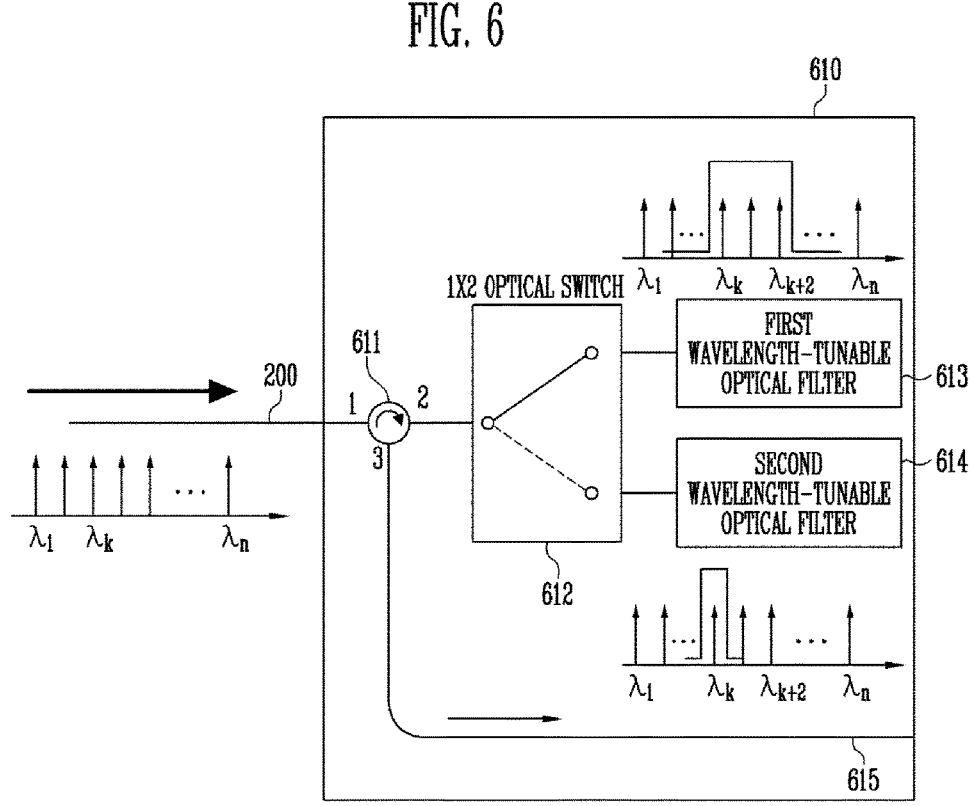
FIG. 6 is a view illustrating a wavelength/bandwidth tunable optical filter according to a third embodiment of the present disclosure.

FIG. 6 is a view illustrating a wavelength/bandwidth tunable optical filter according to a third embodiment of the present disclosure.

Referring to FIG. 6, the wavelength/bandwidth tunable optical filter according to the third embodiment of the present disclosure 610 receives a WDM optical signal from the optical cable 200, and extracts one or more desired wavelengths (one or more from λ1 to λn) from the received WDM optical signal. For this purpose, the wavelength/bandwidth tunable optical filter 610 has an optical circulator 611, optical switch 612, first wavelength-tunable optical filter 613 and second wavelength-tunable optical filter 614.

The optical circulator 611 receives a WDM optical signal from the optical cable 200. The optical circulator 611 that received the WDM optical signal provides the WDM optical signal to the optical switch 612. For this purpose, the optical circulator 611 may consist of a three-port optical circulator.

The optical switch 612 connects the first wavelength-tunable optical filter 613 or second wavelength-tunable optical filter 614 with the optical circulator 611. That is, the optical switch 612 provides the WDM optical signal received from the optical circulator 611 to the first wavelength-tunable optical filter 613 or second wavelength-tunable optical filter 614. Meanwhile, since the wavelength/bandwidth tunable optical filter 610 includes two optical filters 613, 614, a 1×2 optical switch may be selected to be used as the optical switch 612.

The first wavelength-tunable optical filter 613 and second wavelength-tunable optical filter 614 have different bandwidths from each other, and thus the first wavelength-tunable optical filter 613 and second wavelength-tunable optical filter 614 each reflects the WDM optical signal corresponding to their bandwidths.

The first wavelength-tunable optical filter 613 reflects the first wavelengths positioned in the first bandwidth. For example, the first wavelength-tunable optical filter 613 may reflect the $k^{th}$ wavelength (λk) to $K+2^{th}$ wavelength (λk+2). Herein, the first bandwidth of the first wavelength-tunable optical filter 613 is set to be tunable. For example, the first wavelength-tunable optical filter 613 may consist of optical components and optical modules such that a bandwidth is tunable.

The second wavelength-tunable optical filter 614 reflects the second wavelength positioned in the second bandwidth. For example, the second wavelength-tunable optical filter 614 may reflect the $k^{th}$ wavelength (λk). Herein, the second bandwidth of the second wavelength-tunable optical filter 614 is set to be tunable. For example, the second wavelength-tunable optical filter 614 may consist of optical components and optical modules such that a bandwidth is tunable.

To explain the operational process, first of all, the optical circulator 611 provides the WDM optical signal received from the optical cable 200 to the optical switch 612. The optical switch 612 provides the WDM optical signal received from the optical circulator 611 to the first wavelength-tunable optical filter 613 or second wavelength-tunable optical filter 614.

For example, the optical switch 612 may provide the WDM optical signal to the first wavelength-tunable optical filter 613. When the WDM optical signal is provided to the first wavelength-tunable optical filter 613, the first wavelengths (λk to λk+2) positioned in the first bandwidth are reflected. The first wavelengths (λk to λk+2) reflected by the first wavelength-tunable optical filter 613 are provided to the optical circulator 611 via the optical switch 612. The optical circulator 611 provides the first wavelengths (λk to λk+2) received from the first wavelength-tunable optical filter 613 to the output port 615.

Meanwhile, the optical switch 612 may provide the WDM optical signal to the second wavelength-tunable optical filter 614. When the WDM optical signal is provided to the second wavelength-tunable optical filter 614, the second wavelength (λk) positioned in the second bandwidth is reflected. The second wavelength (λk) reflected by the second wavelength-tunable optical filter 614 is provided to the optical circulator 611 via the optical switch 612. The optical circulator 611 provides the second wavelength (λk) received from the second wavelength-tunable optical filter 614 to the output port 615.

As aforementioned, the wavelength/bandwidth tunable optical filter according to the third embodiment of the present disclosure 610 has the first wavelength-tunable optical filter 613 and second wavelength-tunable optical filter 614 having different bandwidths from each other, and the wavelength/bandwidth tunable optical filter 610 provides a WDM optical signal to the first wavelength-tunable optical filter 613 or second wavelength-tunable optical filter 614 using the optical switch 612. At least one waveform corresponding to a bandwidth is reflected by the first wavelength-tunable optical filter 613 or second wavelength-tunable optical filter 614, and the reflected at least one waveform is output to the output port 615. That is, according to the present disclosure, it is possible to control the wavelengths being output to the output port 615 by controlling the connection of the optical switch 612.

Meanwhile, although FIG. 6 illustrates that the wavelength/bandwidth tunable optical filter 610 includes two wavelength-tunable optical filters 613, 614, there is no limitation thereto.

Figure 7:
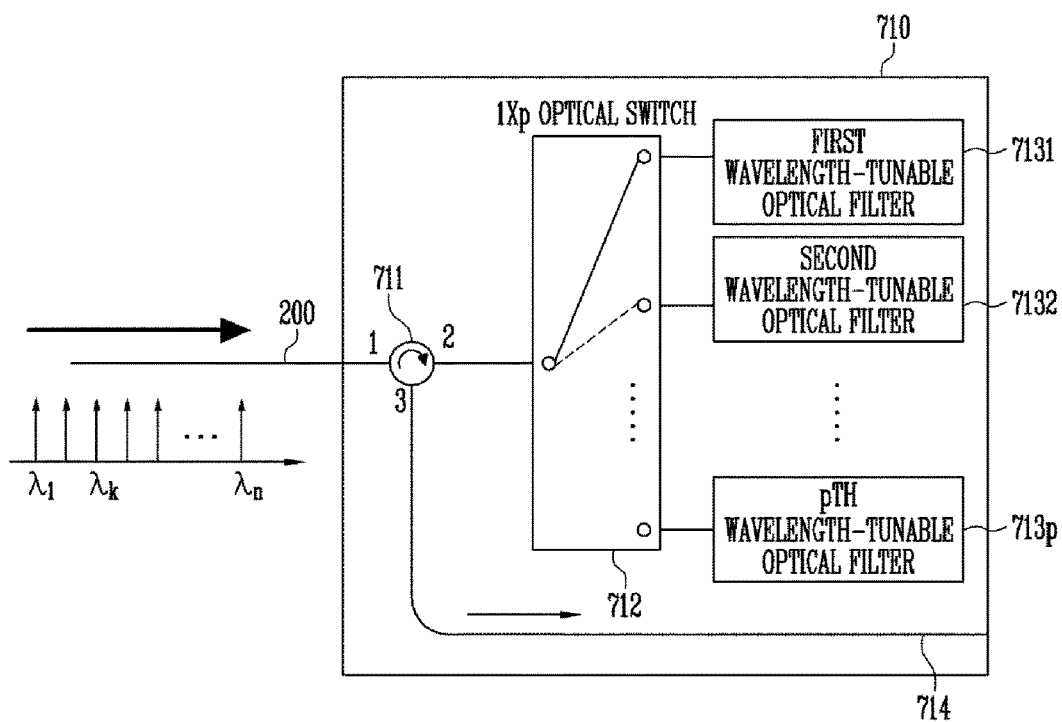
FIG. 7 is a view illustrating a wavelength/bandwidth tunable optical filter according to a fourth embodiment of the present disclosure.

FIG. 7 is a view illustrating a wavelength/bandwidth tunable optical filter according to a fourth embodiment of the present disclosure.

Referring to FIG. 7, the wavelength/bandwidth tunable optical filter according to the fourth embodiment of the present disclosure 710 receives a WDM optical signal from the optical cable 200, and extracts one or more desired wavelengths (one or more from λ1 to λn) from the received WDM optical signal. For this purpose, the wavelength/bandwidth tunable optical filter 710 has an optical circulator 711, optical switch 712, and p wavelength-tunable optical filters 7131 to 713*p* (p being a natural number of 3 or above).

The optical circulator 711 receives a WDM optical signal from the optical cable 200. The optical circulator 711 that received the WDM optical signal provides the WDM optical signal to the optical switch 712. For this purpose, the optical circulator 711 may consist of a three-port optical circulator.

The optical switch 712 connects any one of the p wavelength-tunable optical filters 7131 to 713*p* to the optical circulator 711 (1×p optical switch). That is, the optical switch 712 provides the WDM optical signal received from the optical circulator 611 to any one of the p wavelength-tunable optical filters 7131 to 713*p*.

The p wavelength-tunable optical filters 7131 to 713*p* have different bandwidths from one another, and reflect the WDM optical signal corresponding to their bandwidths. Herein, each of the p wavelength-tunable optical filters 7131 to 713*p* may consist of optical components and optical modules of which bandwidths may be tuned. Additionally, since each of the p wavelength-tunable optical filters 7131 to 713*p* reflects the WDM optical signal of different bandwidths, the wavelengths reflected by the p wavelength-tunable optical filters 7131 to 713p are set to be different from one another.

For example, the first wavelength-tunable optical filter 7131 may reflect the $k^{th}$ wavelength ($\lambda k$) to $k+2^{th}$ wavelength ($\lambda k+2$), and the second wavelength-tunable optical filter 7132 may reflect the first wavelength ($\lambda 1$) to second wavelength ($\lambda 2$). Furthermore, the $p^{th}$ wavelength-tunable optical filter 713p may reflect the $k^{th}$ wavelength ($\lambda k$).

To explain the operational process, first of all, the optical circulator 711 provides the WDM optical signal received from the optical cable 200 to the optical switch 712. The optical switch 712 provides the WDM optical signal received from the optical circulator 711 to any one of the p wavelength-tunable optical filter 7131 to 713p.

The wavelength-tunable optical filter (any one of 7131 to 713p) that received the WDM optical signal from the optical switch 712 reflects at least one wavelength corresponding to its bandwidth. The at least one wavelength reflected by the wavelength-tunable optical filter (any one of 7131 to 713p) is provided to the optical circulator 711 via the optical switch 712. The optical circulator 711 provides the at least one wavelength reflected by the wavelength-tunable optical filter (any one of 7131 to 713p) to the output port 714.

The aforementioned wavelength/bandwidth tunable optical filter according to the fourth embodiment of the present disclosure 710 has p wavelength-tunable optical filters 7131 to 713p having different bandwidths from one another, and provides the WDM optical signal to any one of the p wavelength-tunable optical filters 7131 to 713p using the optical switch 712. Then, at least one waveform corresponding to a bandwidth is reflected by the any one of the p wavelength-tunable optical filters 7131 to 713p, and the at least one reflected waveform is output to the output port 714. That is, according to the present disclosure, it is possible to control the wavelengths being output to the output port 714 by controlling the connection of the optical switch 712.

It should be understood that the technical concept of the present disclosure has been described according to the aforementioned various embodiments, but these embodiments are intended for explaining the present disclosure, and not to limit the present disclosure. Furthermore, one skilled in the art will understand that various modifications can be made within the technical scope of the preset disclosure.

The right of scope of the aforementioned disclosure will be defined by the claims attached hereto, and thus will not be limited by the disclosure in the detailed description of the present disclosure, and any change or modification equivalent to the claims will fall within the scope of the present disclosure.

What is claimed is:

1. A wavelength/bandwidth tunable optical filter connected to an optical cable, the optical filter comprising:
    an optical circulator configured to receive a Wavelength-Division-Multiplexing (WDM) optical signal from the optical cable, the optical signal including one or more wavelengths; and
    a first wavelength-tunable optical filter configured to
        be tuned to reflect one or more wavelengths included in a first bandwidth,
        receive the WDM optical signal via the optical circulator, and
        reflect a first signal having one or more wavelengths in the first bandwidth, thereby to transmit a reflected first signal to the optical circulator; and
    a second wavelength-tunable optical filter configured to
        be tuned to reflect one or more wavelengths included in a second bandwidth,
        receive the reflected first signal via the optical circulator, and
        reflect a second signal having one or more wavelengths in the second bandwidth, thereby to transmit a reflected second signal to the optical circulator, the first and second bandwidths including at least one same wavelength so that the reflected second signal has said at least one same wavelength.

2. The wavelength/bandwidth tunable optical filter of claim 1, wherein the optical circulator includes an output port and provides at least one wavelength commonly reflected by the first and second wavelength-tunable optical filters to the output port.

3. The wavelength/bandwidth tunable optical filter of claim 1, further comprising an optical switch for selectably connecting the optical circulator to the first wavelength-tunable optical filter or the second wavelength-tunable optical filter.

4. The wavelength/bandwidth tunable optical filter of claim 3, wherein the optical circulator includes an output port and provides at least one wavelength commonly reflected by the first and second wavelength-tunable optical filters to the output port through the optical switch.

5. The wavelength/bandwidth tunable optical filter of claim 3, wherein the optical circulator includes first to third ports, the first port is connected to the optical cable, a second port is connected to the optical switch, and the fourth port is an output port to output the second signal.

6. The wavelength/bandwidth tunable optical filter of claim 1, wherein the first and second bandwidth are tunable.

7. A wavelength/bandwidth tunable optical filter comprising:
    a first wavelength-tunable optical filter connected to an optical cable, and configured to
        be tuned to reflect one or more wavelengths included in a first bandwidth,
        receive a Wavelength-Division-Multiplexing (WDM) optical signal including one or more wavelengths, from the optical cable, and
        reflect a first signal having one or more wavelengths within the first bandwidth,
    thereby to transmit a reflected first signal; and
    a second wavelength-tunable optical filter connected to the first wavelength-tunable optical filter in series, and configured to
        be tuned to reflect one or more wavelengths included in a second bandwidth,
        receive the reflected first signal from the first wavelength-tunable optical filter, and
        reflect a second signal having one or more wavelengths within the second bandwidth, thereby to transmit a reflected second signal to the optical circulator, the first and second bandwidths including at least one same wavelength so that the reflected second signal has said at least one same wavelength.

8. The wavelength/bandwidth tunable optical filter of claim 7, wherein the first and second bandwidth are tunable.

9. A driving method of a wavelength/bandwidth tunable optical filter, the method comprising:
    inputting a Wavelength-Division-Multiplexing (WDM) optical signal into an optical circulator, the optical signal including one or more wavelengths;
    providing the WDM optical signal received from the optical circulator to a first wavelength-tunable optical filter;

reflecting, by the first wavelength-tunable optical filter, a first signal having one or more wavelengths within a first bandwidth, thereby to transmit a reflected first signal to the optical circulator;

receiving, by a second wavelength-tunable optical filter, the reflected first signal via the optical circulator, reflecting, by a second wavelength-tunable optical filter, a second signal having one or more wavelengths within a second bandwidth, thereby to transmit a reflected second signal to the optical circulator, the first and second bandwidths including at least one same wavelength so that the reflected second signal has said at least one same wavelength; and outputting the reflected second signal through the optical circulator.

10. The wavelength/bandwidth tunable optical filter of claim 1, wherein the optical circulator includes first to fourth ports, the first port is connected to the optical cable, a second port is connected to the first wavelength-tunable optical filter, a third port is connected to the second wavelength-tunable optical filter, and the fourth port is an output port to output the second signal.

\* \* \* \* \*